(12) United States Patent
Kalfa Kilickan et al.

(10) Patent No.: US 12,024,800 B2
(45) Date of Patent: Jul. 2, 2024

(54) WOVEN FABRIC HAVING THE ASPECT OF A SCUBA FABRIC, AND METHOD FOR PRODUCING THE SAME

(71) Applicant: SANKO TEKSTIL ISLETMELERI SAN. VE TIC. A.S., Inegol-Bursa (TR)

(72) Inventors: Esin Kalfa Kilickan, Inegol-Bursa (TR); Fatma Korkmaz, Inegol-Bursa (TR); Mustafa Zeyrek, Inegol-Bursa (TR); Ertug Erkus, Inegol-Bursa (TR)

(73) Assignee: Sanko Tekstil Islemeleri San. Ve Tic. A.S., Inegol-Bursa (TR)

( * ) Notice: Subject to any disclaimer, the term of this patent is extended or adjusted under 35 U.S.C. 154(b) by 53 days.

(21) Appl. No.: 14/500,080

(22) Filed: Sep. 29, 2014

(65) Prior Publication Data
US 2016/0083877 A1   Mar. 24, 2016

Related U.S. Application Data

(63) Continuation of application No. PCT/EP2014/070284, filed on Sep. 23, 2014.

(51) Int. Cl.
| | |
|---|---|
| *B32B 37/12* | (2006.01) |
| *B32B 5/02* | (2006.01) |
| *B32B 5/22* | (2006.01) |
| *B32B 5/26* | (2006.01) |
| *B32B 7/12* | (2006.01) |
| *D03D 1/00* | (2006.01) |

(Continued)

(52) U.S. Cl.
CPC ............ *D03D 15/56* (2021.01); *B32B 5/22* (2013.01); *B32B 5/26* (2013.01); *B32B 7/12* (2013.01); *D03D 1/00* (2013.01); *D03D 13/004* (2013.01); *D06B 5/08* (2013.01); *D06M 15/21* (2013.01); *B32B 5/024* (2013.01); *B32B 37/12* (2013.01); *B32B 2255/02* (2013.01); *B32B 2255/26* (2013.01); *B32B 2305/18* (2013.01); *B32B 2307/4026* (2013.01); *B32B 2307/51* (2013.01); *B32B 2437/00* (2013.01); *D06B 3/18* (2013.01); *D06C 15/02* (2013.01); *D10B 2403/0114* (2013.01); *D10B 2501/04* (2013.01)

(58) Field of Classification Search
None
See application file for complete search history.

(56) References Cited

U.S. PATENT DOCUMENTS

| | | | |
|---|---|---|---|
| 5,747,392 A | * | 5/1998 | Xiao .................... D06N 3/0059 442/124 |
| 2002/0040495 A1 | | 4/2002 | Long |

(Continued)

FOREIGN PATENT DOCUMENTS

| | | |
|---|---|---|
| CA | 2 810 201 A1 | 11/2013 |
| CN | 102268764 A | 12/2011 |

(Continued)

OTHER PUBLICATIONS

Machine translation of CN 102268764, Dec. 2011.*

(Continued)

*Primary Examiner* — Shawn Mckinnon
(74) *Attorney, Agent, or Firm* — Sughrue Mion, PLLC (57) ABSTRACT

A woven fabric that has the appearance of a neoprene fabric is obtained with a double face fabric in which the warp yarns passes at least three weft yarns on each side of the fabric.

5 Claims, 7 Drawing Sheets

(51) Int. Cl.
    D03D 13/00    (2006.01)
    D03D 15/56    (2021.01)
    D06B 5/08     (2006.01)
    D06M 15/21    (2006.01)
    D06B 3/18     (2006.01)
    D06C 15/02    (2006.01)

(56) References Cited

U.S. PATENT DOCUMENTS

| | | | |
|---|---|---|---|
| 2003/0066571 A1 | 4/2003 | Ono et al. | |
| 2003/0109188 A1 | 6/2003 | Hartert et al. | |
| 2003/0157853 A1 | 8/2003 | Huber et al. | |
| 2004/0035489 A1 | 2/2004 | Thiriot | |
| 2005/0208854 A1* | 9/2005 | Sadato | A41D 3/04 442/289 |
| 2007/0004303 A1* | 1/2007 | Tanaka | D02G 3/32 442/182 |
| 2010/0075557 A1* | 3/2010 | Shteiyer | D03D 15/0011 442/203 |

FOREIGN PATENT DOCUMENTS

| | | |
|---|---|---|
| CN | 102288784 A | 12/2011 |
| CN | 102534948 A | 7/2012 |
| CN | 103374779 A | 10/2013 |
| EP | 1 676 944 A1 | 7/2006 |
| EP | 2 832 907 A1 | 2/2015 |
| FR | 2486114 A1 | 1/1982 |
| JP | 200382560 A | 3/2003 |
| JP | 2003-113549 A | 4/2003 |
| JP | 2004-84129 A | 3/2004 |
| JP | 2005-187962 A | 7/2005 |
| WO | 0214588 A1 | 2/2002 |
| WO | 2006/040679 A3 | 4/2006 |
| WO | 2006040679 A2 | 4/2006 |
| WO | 2006/067316 A1 | 6/2006 |
| WO | 2008/130563 A1 | 10/2008 |
| WO | 2012/062480 A2 | 5/2012 |
| WO | 2015/151820 A1 | 10/2015 |

OTHER PUBLICATIONS

Machine translation of JP 2003082560, Koe et al. (Year: 2003).*
Handbook of Sustainable Textile Production, Marion Tobler-Rohr, p. 201 (Year: 2011).*
International Search Report dated May 20, 2015, issued by the International Searching Authority in counterpart International Application No. PCT/EP2014/070284.
Thomas Meyer Zur Capellen: "Doppeltuch & Reversseide" In: "Lexikon der Gewebe", Dec. 31, 2012 (Dec. 31, 2012), Deutscher Fachverlag, Frankfurt am Main, XP055158802, ISBN: 978-3-86-641258-3 p. 94, col. 2, paragraph 2 p. 308, col. 1, paragraph 1.
Communication dated Feb. 2, 2018, from State Intellectual Property Office of the P.R.C. in counterpart application No. 201510613616.0.
Communication dated Dec. 5, 2018, from the State Intellectual Property Office of People's Republic of China in counterpart Application No. 201510613616.0.
Communication dated Jul. 29, 2019, from the State Intellectual Property Office of People's Republic of China in counterpart Application No. 201510613616.0.
Communication dated Oct. 1, 2019, from the Japanese Patent Office in counterpart application No. 2015-187220.
Communication dated Aug. 8, 2019, from the European Patent Office in counterpart European Application No. 19174116.4.
Office Action dated Jun. 2, 2020 in Japanese Application No. 2015-187220.

F. Donat, Large Book of Textile Designs, Apr. 7, 1895, 9 pages.
Melamine resin, From Wikipedia, the free encyclopedia, Retrieved from the Internet [https://en.wikipedia.org/wiki/Melamine_resin], retrieved Jan. 22, 2020, 1 page total.
Silicone, From Wikipedia, the free encyclopedia, Retrieved from the Internet [https://en.wikipedia.org/wiki/Silicone], retrieved Jan. 22, 2020, 8 pages total.
Polybutylene terephthalate, From Wikipedia, the free encyclopedia, Retrieved from the Internet [https://en.wikipedia.org/wiki/Polybutylene_terephthalate], retrieved Jan. 17, 2020, 1 page total.
"Standard Test Methods for Stretch Properties of Fabrics Woven from Stretch Yarns", Designation: D3107-07 (Reapproved 2011), License for ASTM D 3107 : 2007 : R2011 : EN : Combined PDF, SAI Global, Oct. 2, 2019, pp. 1-6 (7 pages total).
Double cloth, From Wikipedia, the free encyclopedia, Retrieved from the Internet [https://en.wikipedia.org/wiki/Double_cloth], retrieved Jan. 6, 2020, 2 pages total.
Notice of opposition to a European patent dated Feb. 14, 2020, issued by the European Patent Office in application No. EP15186071.5.
Communication dated Feb. 25, 2021, from the China National Intellectual Property Administration in application No. 201510613616.0.
Communication dated Apr. 6, 2021, from the Japanese Patent Office in Application No. 2015-187220.
Communication dated Sep. 27, 2021 from the Chinese Patent Office in Chinese Application No. 201510613616.0.
Communication dated Mar. 1, 2022 from the European Patent Office in European Application No. 15186071.5.
Communication dated Apr. 29, 2021 from the European Patent Office in European Application No. 15186071.5.
Response to Opposition dated Sep. 11, 2020 in European Application No. 15186071.5.
Communication dated Jul. 16, 2021 from the European Patent Office in European Application No. 15186071.5.
Response to Summons dated Jan. 4, 2022 in European Application No. 15186071.5.
Communication dated Jan. 10, 2022 from the European Patent Office in European Application No. 15186071.5.
The Textile Institute Textile Terms and Definitions Committee, "Textile Terms and Definitions", The Textile Institute, 11$^{th}$ edition, 2002, pp. 114 (4 pages total).
Applicant's Response to Opponent's Grounds of Appeal,—Appeal Number T1487 /22-3.2.06—European Patent EP3000920 in European Application No. 15186071.5, Jan. 9, 2023 (67 pages).
"TEXTILE Terms and Definitions", The Textile Institute, Fourth Edition, Jan. 1960, p. 159 (2 pages).
Applicant's Grounds of Appeal and Aux Requests—Appeal Number T1487/22—European Patent EP3000920 in European Application No. 15186071.5, Aug. 5, 2022, pp. 1-48 (130 pages total).
Grounds of Appeal filed by Opponent Troesch—Appeal Number T1487/22—European Patent EP3000920—Application No. 15186071.5, Troesch Scheidegger Werner AG, Aug. 5, 2022, pp. 1-30 (30 pages total).
Y. E. Ei Mogahzy, "Engineering textiles: Integrating the design and manufacture of textile products", Woodhead Publishing in Textiles, 2009, No. 81, pp. 242-243, 276-277 (8 pages total).
Roller printing on textiles, From Wikipedia, Feb. 27, 2014, retrieved from the Internet: http://en.wikipedia.org/wiki/Roller_printing_on_textiles (1 page total).
Coating, The Free Dictionary, Jun. 12, 2014, retrieved from the Internet: https://www.thefreedictionary.com/coating (2 pages total).
Notice of Opposition filed Jun. 15, 2022 against Patent No. EP3543387 in European Application No. 19174116.4.
Feature Analysis Troesch dated Jun. 15, 2022 (1 page).

* cited by examiner

WOVEN FABRIC HAVING THE ASPECT OF A SCUBA FABRIC, AND METHOD FOR PRODUCING THE SAME

CROSS REFERENCE TO RELATED APPLICATIONS

This application is a Bypass Continuation of International Application No. PCT/EP2014/070284 filed Sep. 23, 2014, the contents of all of which are incorporated herein by reference in their entirety.

BACKGROUND OF THE INVENTION

The present invention relates to a woven fabric having the aspect of a scuba fabric. In greater detail, the present invention relates to a woven fabric, preferably a denim fabric, which mimics the aspect of a scuba, or neoprene, fabric, i.e. the aspect of those fabrics that comprise a layer of neoprene (foamed chloroprene) or of similar foamed plastic material and at least one layer of fabric. In the following description, neoprene will be used in order to disclose and to make reference to neoprene and to any plastic material presently used as a substitute of neoprene.

The present invention also relates to a method for producing a woven fabric having the aspect of a neoprene scuba fabric, including elasticity, volume, comfort and insulation, using a double face woven fabric, possibly in combination with a plastic coating material.

DESCRIPTION OF THE RELATED ART

Scuba fabrics comprise a layer of foamed plastic material, usually neoprene, coupled with at least one external layer of standard fabric; the external fabric provides the visual and aesthetic layer while the foamed layer provides the structure and the elasticity of the final product. An internal fabric layer may be present for increased comfort of the wearer.

Neoprene, or scuba, fabrics were originally devised for scuba suits. Recently, it has become more and more fashionable to use them for sport clothing and also for everyday clothing; actually they are used to produce almost every type of clothing such as e.g. skirts, tops, trousers and similar clothes and apparel items. The presence of a neoprene layer (or of a similar product) gives the fabric a structure and a sport look that up to now was not obtainable with other types of products.

US Patent n° U002040495, describes a conventional wetsuit made of Neoprene-type material.

Chinese Patent n° 103374779, describes double face cloth woven with water repellent fibers. This Patent is not specifically intended for scuba diving but tries to give to the fabric an insulation effect similar to the one accomplished with neoprene. Canadian Patent n° 2810201, describes a scuba diving suit, composed, on the first part, of cellular neoprene provided on both of its sides with a textile fabric. Other parts of the suit like sealing sleeves, neck, collar and sleeve ends are composed of rubber, neoprene or latex.

A problem with neoprene fabrics is their cost; the foamed layer and the fabric must be coupled together in an additional production step. Another problem resides in the sewing steps; sewing together neoprene fabrics is more complicated and time consuming than sewing together woven fabrics. On the other hand, a neoprene layer may be too hot to wear and in some cases may result in an allergic reaction of the skin of the wearer.

SUMMARY OF THE INVENTION

It is an aim of the present invention to solve the above problems and to provide a woven fabric that has the appearance of a neoprene fabric without having to use a neoprene (or other foamed plastic material) layer.

The aim is reached by the present invention, that provides a woven fabric according to claim 1, said fabric having a first side, or front side, and a second side or back side, wherein at least part of the weft yarns are elastic yarns and wherein in a repeat unit of said fabric a warp yarn floats, i.e. passes, over at least three weft yarns to provide a corresponding over portion and the same warp yarn floats or passes under at least three weft yarns to provide a corresponding under portion, whereby in two adjacent warp yarns the over portions of a first yarn are at least in part adjacent to the under portion of the second yarn.

In a preferred embodiment, the fabric has a denim or denim-like weaving pattern. In another preferred embodiment, the warp yarns are indigo dyed.

In another embodiment, the double face fabric is provided with a coating or layer of a curable material; preferably, the material is selected with a viscosity coating such that when the material is applied it penetrates within the fabric to provide an "internal" layer. Another object of the invention is a method of producing composite fabric comprising the steps of providing a double face fabric; coating said fabric at least once and treating said fabric to penetrate said coating into said fabric; optionally curing the coating to provide a cured polymer layer at least in part located within the structure of said fabric.

In another embodiment, the method provides for coupling together a first double face fabric with another fabric selected from a single face fabric and a second double face fabric. The coupling is preferably carried out by binding with an adhesive layer. The first or the second double face fabric could be coated as above discussed.

In still another embodiment, a double face fabric is produced by a method that includes the following steps: preparing first and second single face fabrics, coating said first and second single face fabrics with a curable material, and condensing the double face fabric for polymerization of coating plastic materials, obtaining the final composite fabric; wherein said first and second single face fabrics are obtained by a weaving process, using weft elastic yarns; said coating step include coating first and second single face fabrics separately with a first plastic material; bonding said coated first and second single face fabrics by calendering, obtaining a double face fabric; coating said double face fabric with a second plastic material.

The invention provides a woven fabric that has the look of a scuba, i.e. neoprene, fabric, without the disadvantages of the presence of neoprene. Additionally, the fabric is much more breathable than a neoprene fabric, it is less expensive to produce and can be washed in a standard washing cycle.

Other features and advantages of the invention are disclosed in the following detailed description of exemplary embodiments.

BRIEF DESCRIPTION OF THE DRAWINGS

The invention will be further disclosed from the following detailed description of exemplary embodiments with reference to the accompanying drawings, which should be taken as illustrative and not limiting, in which.

DETAILED DESCRIPTION OF PREFERRED EMBODIMENTS

With reference to the figures, the invention provides for a double face fabric having a first side B and a second side A where warp yarns 2 and weft yarns 3 are woven together to give a pattern on both the first side B and the second side A of the fabric. In a known way, a warp yarn 2 floats over one or more weft yarns 3 to provide a corresponding over portion 4 and floats under one or more weft yarns 3 to provide a corresponding under portion 5. At least part of the weft yarns 3, preferably all the weft yarns 3, are elastic yarns.

According to the invention the pattern is essentially given by the warp yarns: on each face of the fabric, warp yarns 2 float over one or more weft yarns 3 to provide corresponding over portions.

In detail, looking at one side of the fabric of the invention, namely first side or front face B in a repeat unit RU as those shown in FIGS. 1A-7A, the pattern provides that a first warp yarn 2 floats over at least three weft yarns 3 on said first side B of the fabric, so as to provide a corresponding warp over portion 4. The said warp 2 yarn successively floats under one single weft yarn 3 to provide an under portion 5, i.e. a portion of warp yarn that is under a weft yarn. Warp 2 is thus again on the first side of the fabric and can float again over at least three weft yarns.

According to a preferred aspect of the invention, in a repeating unit each warp yarn has a prevalence of over portions or of under portions; as an example, the first warp yarn 2 has a total length of over portions (i.e. the total number of weft yarns over which the warp 2 passes) that is greater than the total length of under portions. In FIG. 1 warp 2' has a total of 6 over portions, i.e. the amount of weft yarns over which the warp passes, shown by the black boxes, is 6 out of a total of 8 weft yarns for the unit RU.

In a preferred embodiment of repeating unit RU of the invention (see e.g. FIGS. 1 and 2), the warps have an alternating pattern: one warp with prevalence of over portions is alternated with a warp having prevalence of under portions. In other words, warp 2' has more over portions than under portions and the two warps 2" and 2'" that are adjacent to warp 2' and are located at its sides (see FIG. 1B) have more under portions than over portions.

Figures 1A, 1B:
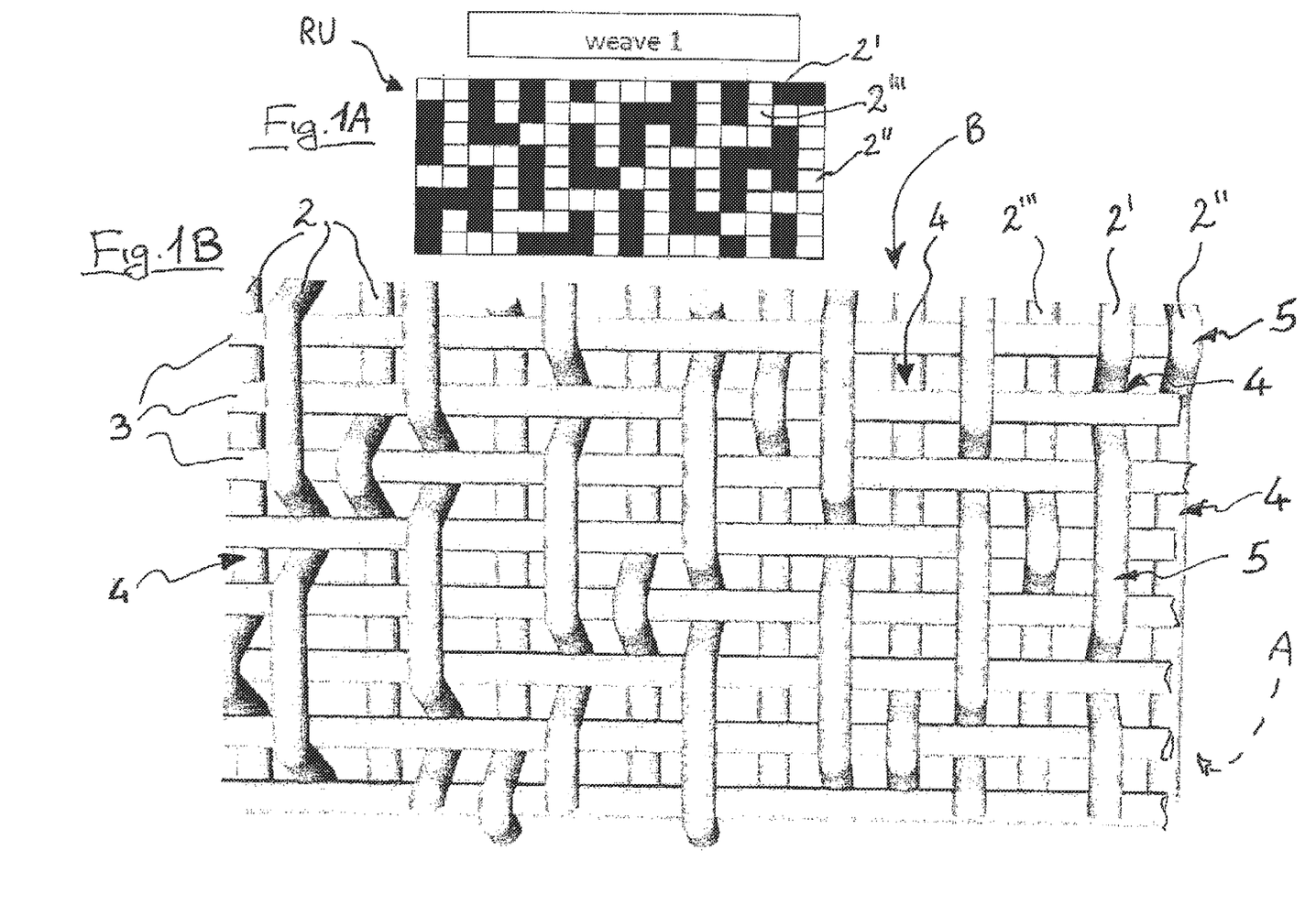
FIGS. 1A and 1B show a preferred embodiment of the fabric of the invention.

According to the invention, each of the two warp yarns 2", 2'" arranged adjacent to said first warp yarn 2', floats under at least three weft yarns to provide a corresponding warp under portion 4 on said second side of the fabric, said warp yarn successively floating over one single weft yarn 3 to provide an over portion 5 on said first side of the fabric. In the embodiment of FIG. 1A and FIG. 1B, that is an RU having 8 weft yarns and 16 warp yarns, warp 2' has a scheme 3/1/3/1 with 3 being the over portions and 1 the under portions; warps 2" and 2'" have a scheme 1/7 where 1 is the over portion and 7 is the under portion.

Preferably, the maximum length of each over or each under portion of a warp yarn is corresponding to 10 weft yarns. In general, in a warp with prevalence of over portions, each of said over portions 5 of said first warp yarn 2' passes at least three weft yarns and is followed by an under portion 4 passing one weft yarn in an N/1/N scheme, where N is an integer within 3 and 10, included.

In a warp with prevalence of under portions, such as adjacent warp yarns 2", 2'" of FIGS. 1A and 1B, each under portion 4 passes at least three weft yarns and is followed by an over portion 5 passing one weft yarn in a 1/M/1 scheme, where M is an integer within 3 and 10, included.

The schemes of two adjacent warp yarns may be identical or different: in the embodiment of FIGS. 1A and 1B the scheme of adjacent warp yarns is different, i.e. 3/1/3/1 and 1/7. In FIG. 4 the scheme is identical: 3/1 or 1/3, i.e. in this embodiment the over portions and the under portions of two adjacent warp yarns have the same length. In all cases the long over or under portions are followed by a single under or over portion of one single weft yarn. The single over or under portions are arranged in the repeating unit RU in a diagonal offset, to provide a denim look.

Figures 7A, 7B:
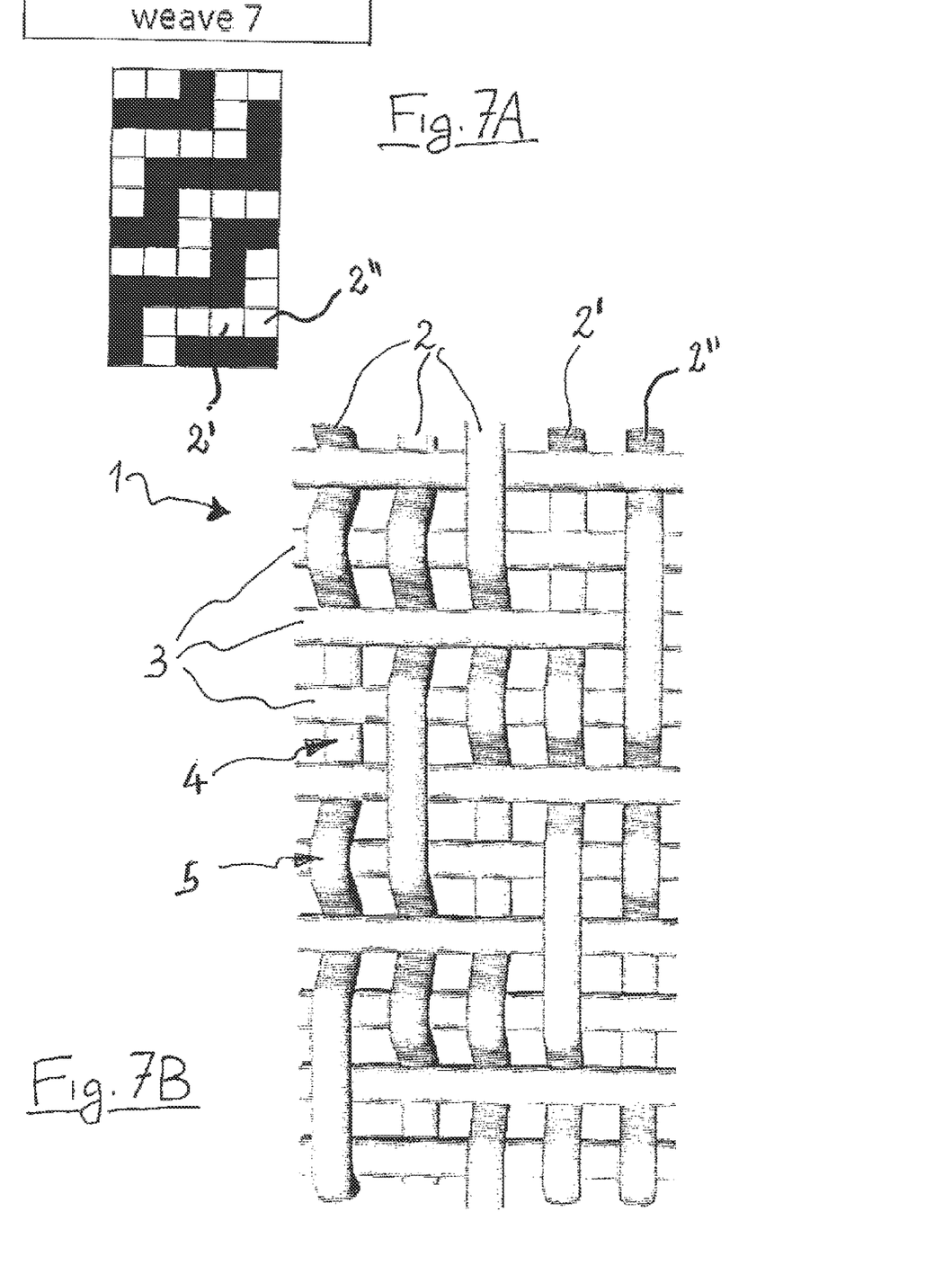
FIG. 7A-7B show another embodiment of the fabric of the invention.

In an embodiment of the invention, shown in FIGS. 7A and 7B, in each same warp over portions and under portions having same length are alternated. In this case there is no prevalence of under portions or of over portions, contrary to the previously discussed embodiments.

According to another embodiment of the invention, shown in FIGS. 1A and 1B, the length of an over portion 4 in yarn 2' is different from the length of the under portions 5 of the adjacent warp yarns 2", 2'".

In any case, it is a most preferred aspect of the invention that over portions 5 and under portions 4 are arranged in a diagonal pattern to provide a denim effect. Preferably, the warp yarns are indigo dyed to provide a jeans effect of the double face fabric. Warp yarns 2 are preferably cotton yarns with Ne in the range of 10 Ne to 60 Ne, preferably 10 to 30 Ne. Weft yarns are of a type known in the art, preferably including an elastomeric core and a sheath of cotton fibers; suitable weft yarns are e.g. those disclosed in PCT/EP2011/005723 in the name of the applicant.

The invention will be now further disclosed with reference to the preferred embodiments shown in the figures.

With reference to FIG. 1, this weave contains 16 different moves in the loom; each has some warps and wefts that overpass each other. Weft yarns 3 (at least one of the weft yarns, preferably all weft yarns) are elastic and shrinking with the effect of elastomeric component. The sequence movements of sixteen warp yarns 2 and eight weft yarns 3 all come together and make one pattern. These patterns all come together and make the general pattern fabric surface on back and front side of the fabric. The blank boxes show an under portion of the warp, i.e. that weft 3 is overpassing the warp yarn 2 and that weft 3 is on front side of the fabric. The black boxes show the warp yarns 2 that overpasses the weft yarn and these warp yarns are visible on the front side B of the fabric and form over portions 5.

In first movement of the loom on warp 2" direction, weft yarn 3 is overpassing the warp yarns and warp yarn is on back of the fabric creating an under portion 4 on back side A. In the second move of the loom on warp direction, warp yarn 2' is overpassing the first two weft yarns, then passing into back side of the fabric under one single weft yarn, then again changing position with weft and overpassing three weft yarns 3 (again on the front side B), then again changes position with weft and passing into back of fabric under one weft yarn and then again passing onto front side on one weft yarn. Warp 2' then continues, in the final fabric, according to the same pattern of over and under portions.

Following the map that black and blank boxes make, all warp and weft yarns are overpassing or floating on/under each other. After the 16th movement on the warp side, from left to right, the pattern turns back to the first movement that warp and weft make together. All these repeats come together and fabric is woven. All these warp and weft movements occurs in 16 different sequences in one report (RU) and after one full report the pattern comes back to first sequence of movements warp/weft make together.

The warp pattern from left to right is 7a/1b, 2b/1a/3b/1a/1b, 4a/1b/3a, 1b/1a/3b/1a/2b, 1a/1b/6a, 1a/3b/1a/3b, 6a/1b/1a, 3b/1a/3b/1a, 3a/1b/4a, 2b/1a/3b/1a/1b, 1b/7a, 1b/1a/3b/1a/2b, 5a/1b/2a, 1a/3b/1a/3b, 2a/1b/5a and 3b/1a/3b/1a; wherein a is an under portion and b is an over portion. The required diagonal look is obtained in that the 1 down over portions are diagonally offset by one weft yarn every three warp yarns.

Figures 2A, 2B:
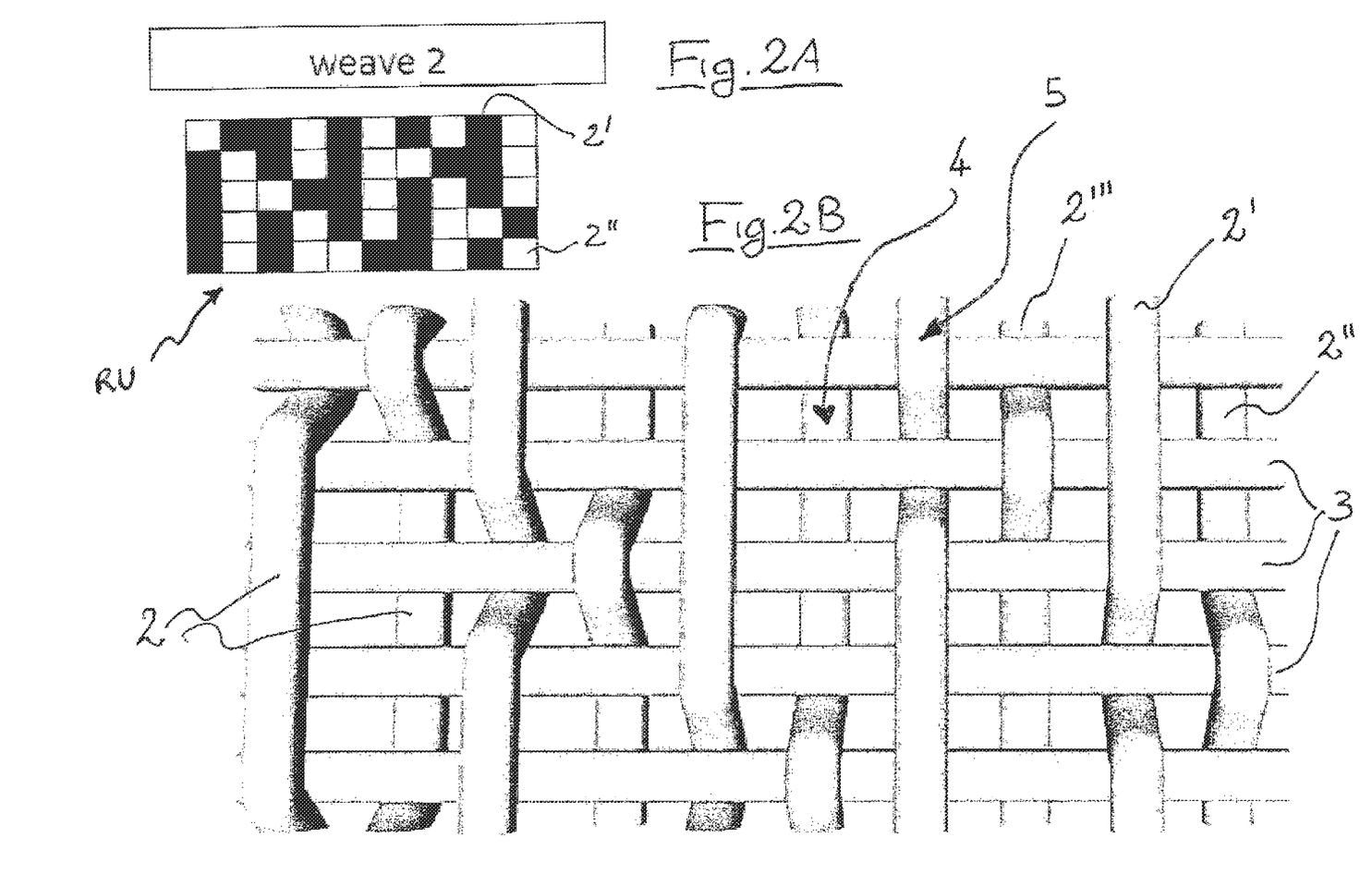
FIG. 2A-2B show another embodiment of the fabric of the invention.

As shown in FIGS. 2A and 2B, this weave contains 10 different moves in the loom. Similarly, the sequence movements of 10 warp yarns and 5 weft yarns of the shown repeat unit all come together and make 1 pattern. After the 10th movement on the warp side, the pattern turns back to the first movement that warp and weft make together. All these warp and weft movements occurs in 10 different sequences in one report and after one full report the pattern comes back to first sequence of movements warp/weft make together.

The warp pattern from left to right is 1a/1b/3a, 1b/1a/3b, 3a/1b/1a, 3b/1a/1b, 1b/4a, 1a/4b, 2a/1b/2a, 2b/1a/2b, 4a/1b and 4b/1a; wherein a is an under portion and b is an over portion. The required diagonal look is obtained in that the 1 up over portions are diagonally offset by two weft yarns every three warp yarns: the 1 up over portion in yarn 2" is offset from the 1 up over portion of yarn 2''' by two weft yarns, i.e. there is one weft yarn between the two over portions in 2''' and 2".

Figure 3:
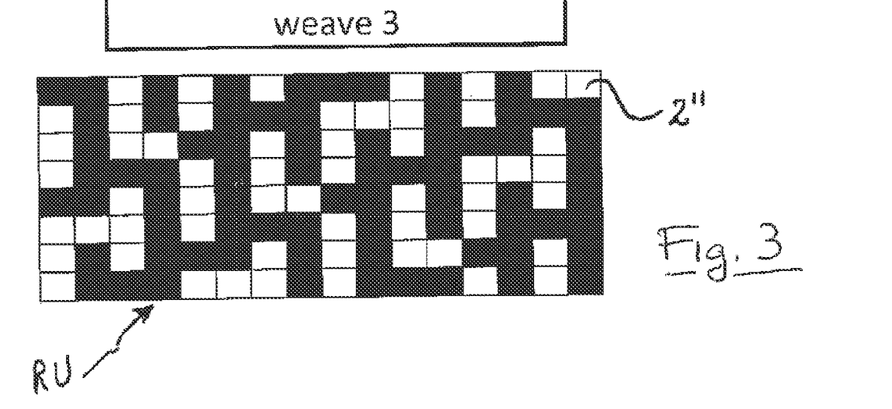
FIG. 3 shows the embodiment of FIG. 1A in a reversed pattern.

The weave in FIG. 3 is the same as the one shown in FIGS. 1A and 1B, but in reverse, meaning that the front side and the back side are exchanged: warp 2" has thus a 7up/1down scheme, opposite to the scheme of the same warp 2" in FIG. 1.

Figures 4A, 4B:
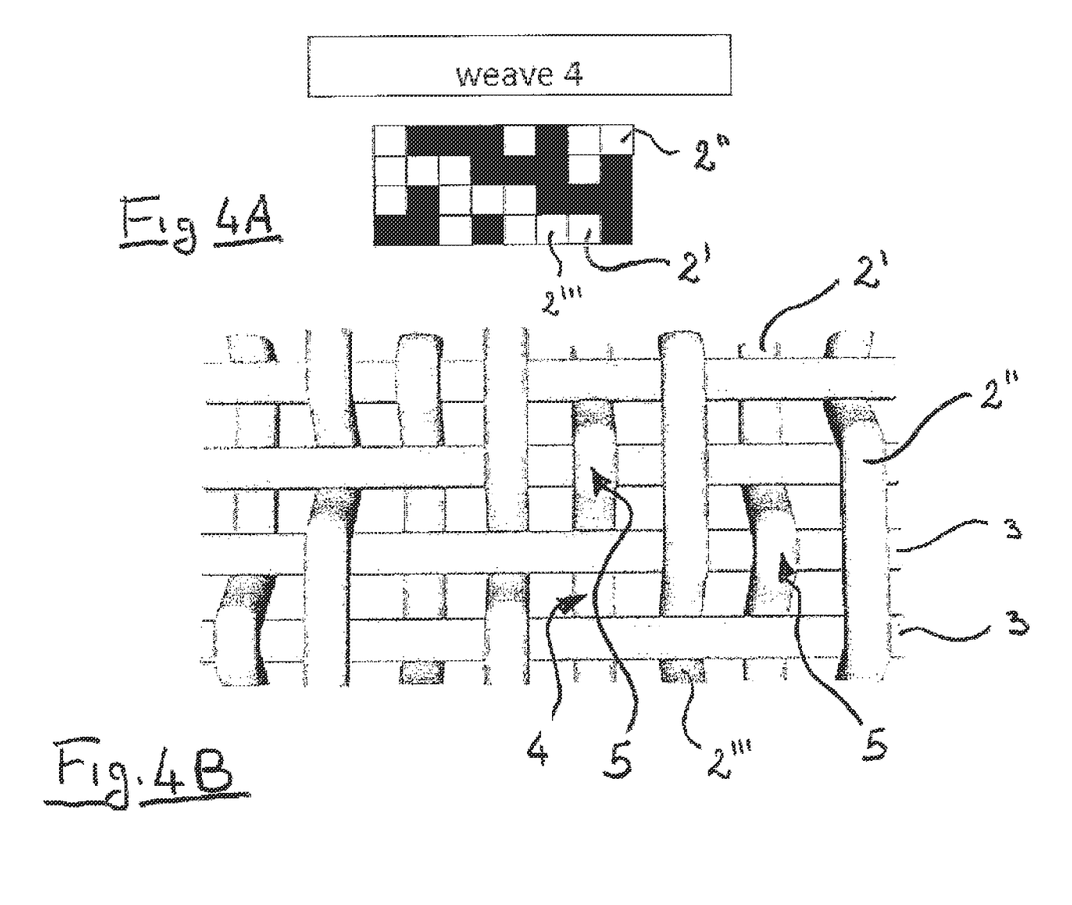
FIG. 4A-4B show another embodiment of the fabric of the invention.

As shown in FIG. 4A-4B, this weave contains 8 different moves in the loom. Similarly, the sequence movements of 8 warp yarns and 4 weft yarns of RU, all come together and make 1 pattern. After the 8th movement on the warp side, the pattern turns back to the first movement that warp and weft make together. All these warp and weft movements occur in 8 different sequences in one report and after one full report the pattern comes back to first sequence of movements warp/weft make together.

The warp pattern from left to right is 3b/1a, 1a/1b/2a, 1a/3b, 2a/1b/1a, 1b/1a/2b, 3a/1b, 2b/1a/1b and 1b/3a; wherein a is an under portion and b is an over portion.

Figure 5A:
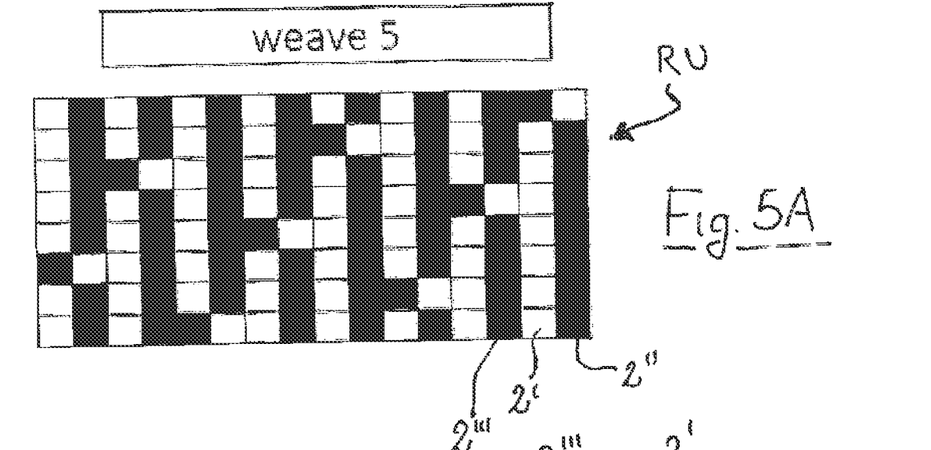
FIG. 5A-5B show another embodiment of the fabric of the invention.
Figure 5B:
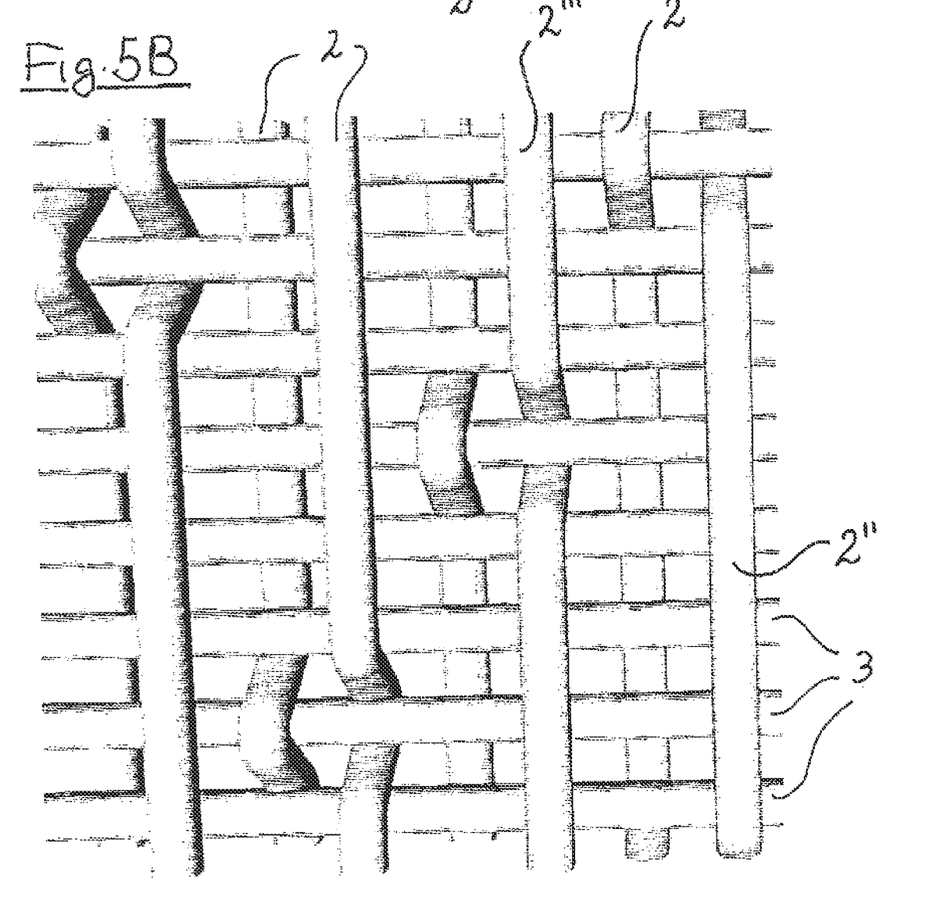

As shown in FIG. 5A-5B, this weave contains 16 different moves in the loom. Similarly to the weave in FIG. 1 but with a different pattern, the sequence movements of 16 warp yarns and 8 weft yarns all come together and make one pattern. After the 16th movement on the warp side, the pattern turns back to the first movement that warp and weft make together. All these warp and weft movements occurs in 16 different sequences in one report and after one full report the pattern comes back to first sequence of movements warp/weft make together. FIG. 5B shows only part of FIG. 5A pattern, starting from left side of FIG. 5A.

The warp pattern 7b/1a, 7a/1b, 4b/1a/3b, 4a/1b/3a, 1b/1a/6b, 1a/1b/6a, 6b/1a/1b, 6a/1b/1a, 3b/1a/4b, 3a/1b/4a, 1a/7b, 1b/7a, 5b/1a/2b, 5a/1b/2a, 2b/1a/5b and 2a/1b/5a; wherein a is an under portion and b is an over portion. In this pattern the warps have the same 7up/1down and 1down/7up scheme, alternated; because of the diagonal arrangement, in a repeat unit the scheme is split as above shown, while the length of over portions and under portions in the fabric remains 7 weft yarns long (the same notice applies to the other weave reports of the figures).

Figure 6:
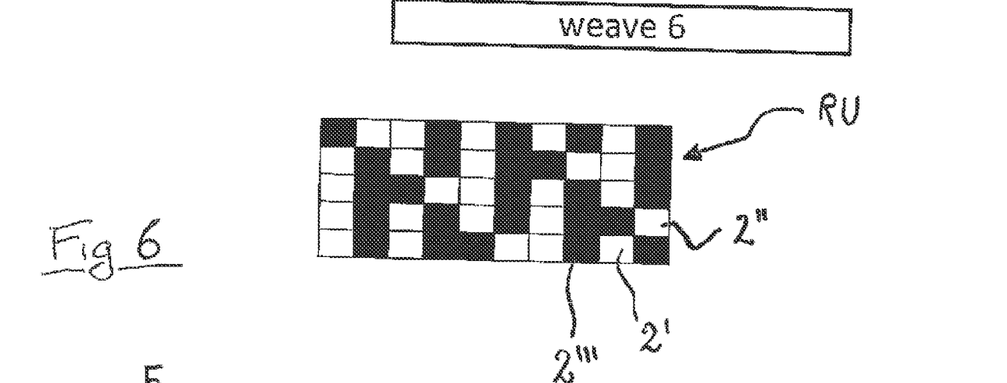
FIG. 6 shows the embodiment of FIG. 2A in a reverse pattern.
Figure 8:
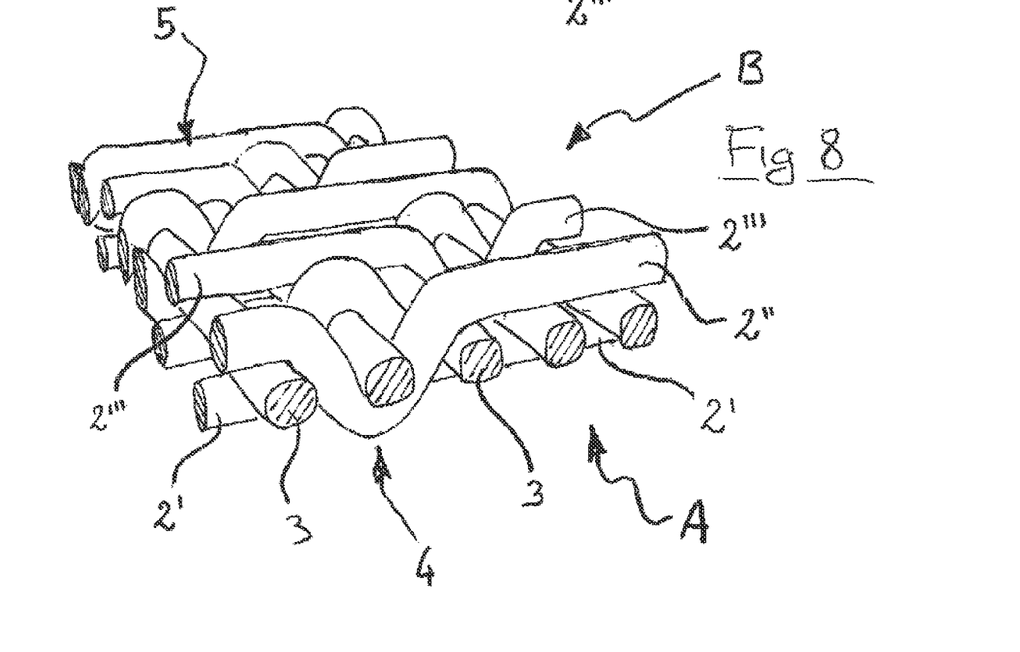
FIG. 8 is a perspective view of the fabric of FIG. 6.

The weave of FIG. 6 and FIG. 8 is the same as the one shown in FIG. 2A-2B, but in reverse, meaning that the front side B and the back side A are exchanged: what were over portions in FIG. 2A are under portions in FIG. 6. The scheme is alternated warps with 4up/1down (warp 2") and 4down/1up (warp 2'). The 1 up over portions are diagonally offset by one weft yarn every 5 warp yarns.

As shown in FIG. 7A-7B, this weave contains five different moves in the loom in a repeat unit (or report) RU of 5 by 10. Similarly, the sequence movements of 5 warp yarns and 10 weft yarns all come together and make one pattern of a repeat unit RU. After the 5th movement on the warp side, the pattern turns back to the first movement that warp and weft make together. All these warp and weft movements occurs in five different sequences in one report and after one full report the pattern comes back to first sequence of movements warp/weft make together.

The warp pattern from left to right is 1b/3a/1b/1a/3b/1a, 1b/1a/3b/1a/1b/3a, 1b/1a/1b/3a/1b/1a/2b, 2a/1b/1a/3b/1a/1b/1a and 3b/1a/1b/3a/1b/1a; wherein a is an under portion and b is an over portion.

As previously mentioned, the embodiment of FIG. 7A-7B is such that each warp yarn alternates over portions 5 and under portions 4 floating on three weft yarns; it is in the scope of this embodiment to include longer over portions and under portions. It should be noticed that after each over portion the warp has one under portion of a single weft yarn; similarly, before each under portion, the warp has one over portion of a single weft yarn. This results in the presence of two single over and under portions of the warp between a long (at least three weft yarns) under portion 4 and a long over portion 5.

Figure 10:
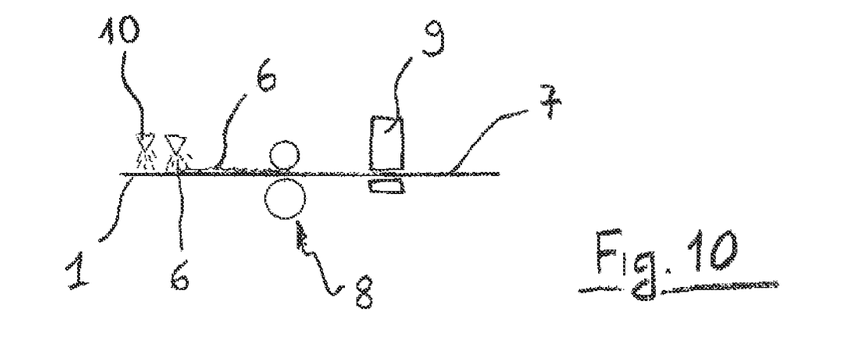
FIG. 10 is a scheme of the steps of a method of providing a polymer layer to a fabric of the invention.

The invention also relates to method of producing composite fabric. According to the invention, the method comprises the steps of providing a double face fabric 1; applying to said fabric at least once a polymer material 6 and treating said fabric to penetrate said coating into said fabric. According to a preferred embodiment, the polymer material 6 is applied to the fabric e.g. by a coating device 10 or by a spray device; the fabric with the applied coating is treated by feeding it to a calender 8 (FIG. 10) to penetrate the coating into the fabric 1. In the preferred embodiment, the coating contains additives that are suitable to start a curing reaction upon activation of the additives in curing device 10.

Figure 9:
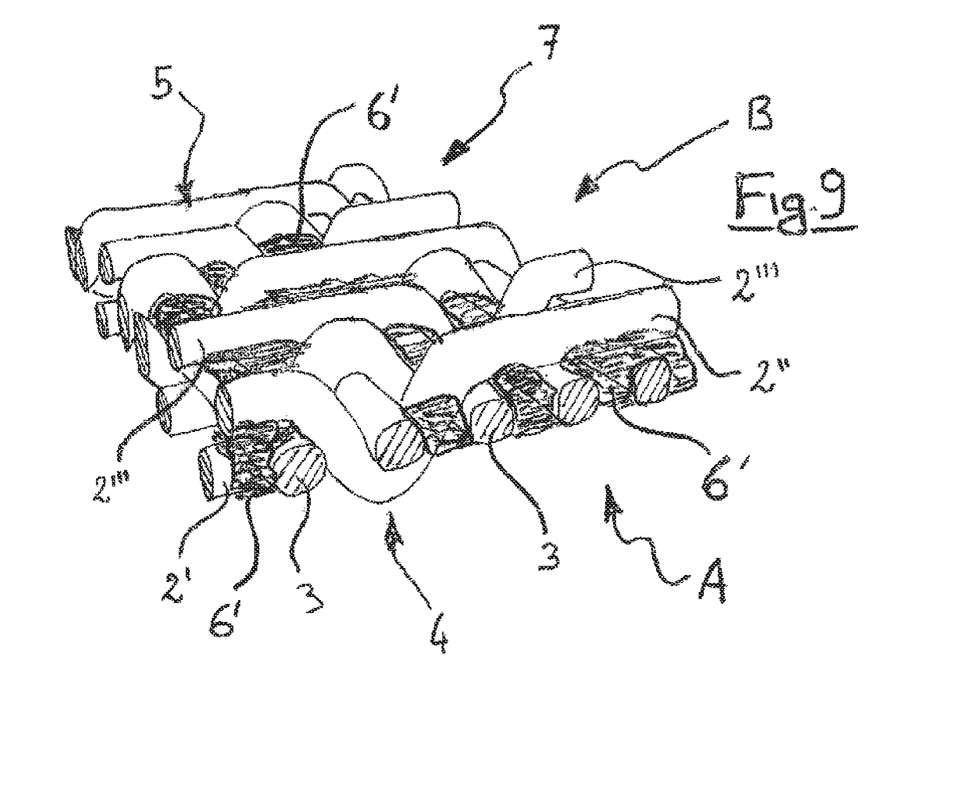
FIG. 9 is a perspective view of the fabric of FIG. 6 provided with a polymer layer.

In other words, the polymer material 6 used for coating is applied to the fabric 1 in a layer and the thus obtained coated fabric is calendered when the polymer material is still workable so as to squeeze the polymer into the fabric. At this point of the process the coating is cross-linked in a device 9, where additives are activated, to provide a cured (cross-linked or polymerized) polymer layer at least in part located within the structure of said fabric; the obtained fabric 7 comprises fabric 1 and cured polymer 6', as schematically visible in FIG. 9. In fabric 7, the cured polymer layer 6' is intermixed with the yarns and most of it is housed between the said yarns, so as to maintain the over portions 5 as free as possible from the polymer material 6'.

In another embodiment, the invention method comprises the steps of coupling together a first double face fabric with another fabric selected from a single face fabric and a second double face fabric; the coupling is preferably carried out by binding said fabrics with an adhesive layer. The first or second double face fabric may be coated according to the method previously disclosed before being bound to the other fabric.

According to a further embodiment of the invention, there is provided a method of producing a composite fabric having the characteristics of a neoprene fabric, wherein the method comprises the following steps:

providing first and second single face fabrics; coating said first and second single face fabrics with a polymer material, and condensing the double face fabric for polymerization of coating plastic materials, obtaining the final composite fabric; wherein said first and second single face fabrics are obtained by a weaving process, using weft elastic yarns; said coating step includes coating first and second single face fabrics separately with a first plastic material; bonding said coated first and second single face fabrics by calendering, obtaining a double face fabric; optionally coating said double face fabric with a second plastic material.

Preferably, after applying said polymer material and before curing it, the double face fabric is calendered to penetrate the polymer material into said fabric.

In any of the coating steps above disclosed, two, or more, different polymer materials can be applied to the fabric. In a preferred embodiment, the first and/or the second polymer material are acrylic polymers or acrylate dispersions.

The invention claimed is:

1. A woven double face fabric (1) having warp yarns (2) and weft yarns (3) providing a pattern whereby a warp yarn (2) floats over one or more weft yarns (3) to provide a corresponding over portion (5) and floats under one or more weft yarns to provide under portions (4), at least part of the weft yarns (3) being elastic yarns,
   wherein a repeat unit of a first warp yarn (2') floats over at least three weft yarns on said first side of the fabric to provide a corresponding warp over portion (5), said warp yarn successively floating under one single weft yarn (3) to provide an under portion (4), whereby in said first warp yarn the total length of over portions is greater than the length of under portions, and
   wherein each of two adjacent warp yarns (2", 2''') arranged adjacent said first warp yarn (2') floats under at least three weft yarns to provide a corresponding warp over portion (5) on said second side of the fabric, each said adjacent warp yarn successively floating over one single weft yarn (3) to provide an over portion (5) on said first side of the fabric,
   said fabric having a repeating unit (RU) of 16 warps and 8 wefts, being the warp pattern 7a/1b, 2b/1a/3b/1a/1b, 4a/1b/3a, 1b/1a/3b/1a/2b, 1a/1b/6a, 1a/3b/1a/3b, 6a/1b/1a, 3b/1a/3b/1a, 3a/1b/4a, 2b/1a/3b/1a/1b, 1b/7a, 1b/1a/3b/1a/2b, 5a/1b/2a, 1a/3b/1a/3b, 2a/1b/5a and 3b/1a/3b/1a; wherein a is an under portion and b is an over portion.

2. A woven double face fabric (1) having warp yarns (2) and weft yarns (3) providing a pattern whereby a warp yarn (2) floats over one or more weft yarns (3) to provide a corresponding over portion (5) and floats under one or more weft yarns (3) to provide under portions (4), at least part of the weft yarns (3) being elastic yarns,
   wherein a repeat unit of a first warp yarn (2') floats over at least three weft yarns on said first side of the fabric to provide a corresponding warp over portion (5), said first warp yarn successively floating under one single weft yarn (3) to provide an under portion (4), whereby in said first warp yarn the total length of over portions is greater than the length of under portions, wherein each of two adjacent warp yarns (2", 2''') arranged adjacent said first warp yarn (2') floats under at least three weft yarns to provide a corresponding warp under portion (4) on said second side of the fabric, each said adjacent warp yarn successively floating over one single weft yarn (3) to provide an over portion (5) on said first side of the fabric,
   wherein the length of the over portion (5) of said first warp yarn (2') is different than the length of the under portions (4) of the adjacent warp yarns (2',2"); and
   said fabric having a repeating unit of 10 warps and 5 wefts, being the warp pattern 1a/1b/3a, 1b/1a/3b, 3a/1b/1a, 3b/1a/1b, 1b/4a, 1a/4b, 2a/1b/2a, 2b/1a/2b, 4a/1b and 4b/1a; wherein a is an under portion and b is an over portion.

3. A woven double face fabric (1) having warp yarns (2) and weft yarns (3) providing a pattern whereby a warp yarn (2) floats over one or more weft yarns (3) to provide a corresponding over portion (5) and floats under one or more weft yarns to provide under portions (4), at least part of the weft yarns (3) being elastic yarns,
   wherein a repeat unit of a first warp yarn (2') floats over at least three weft yarns on said first side of the fabric to provide a corresponding warp over portion (5), said first warp yarn successively floating under one single weft yarn (3) to provide an under portion (4), whereby in said first warp yarn the total length of over portions is greater than the length of under portions,
   wherein each of two adjacent warp yarns (2", 2''') arranged adjacent said first warp yarn (2') floats under at least three weft yarns to provide a corresponding warp under portion (4) on said second side of the fabric, each said adjacent warp yarn successively floating over one single weft yarn (3) to provide an over portion (5) on said first side of the fabric,
   wherein the length of the over portion (5) of said first warp yarn (2') is different than the length of the under portions (4) of the adjacent warp yarns (2",2'''); and
   said fabric having a repeating unit of 16 warps and 8 wefts, being the warp pattern 7b/1a, 7a/1b, 4b/1a/3b, 4a/1b/3a, 1b/1a/6b, 1a/1b/6a, 6b/1a/1b, 6a/1b/1a, 3b/1a/4b, 3a/1b/4a, 1a/7b, 1b/7a, 5b/1a/2b, 5a/1b/2a, 2b/1a/5b and 2a/1b/5a; wherein a is an under portion and b is an over portion.

4. A woven double face fabric (1) having warp yarns (2) and weft yarns (3) providing a pattern whereby a warp yarn (2) floats over one or more weft yarns (3) to provide a corresponding over portion (5) and floats under one or more weft yarns to provide under portions (4), at least part of the weft yarns (3) being elastic yarns,
   wherein a repeat unit of a first warp yarn (2') floats over at least three weft yarns on said first side of the fabric to provide a corresponding warp over portion (5), said first warp yarn successively floating under one single weft yarn (3) to provide an under portion (4),
   wherein each of two adjacent warp yarns (2", 2''') arranged adjacent said first warp yarn (2') floats under at least three weft yarns to provide a corresponding warp under portion (4) on said second side of the fabric, each said adjacent warp yarn successively floating over one single weft yarn (3) to provide an over portion (5) on said first side of the fabric, wherein the length of the over portion (5) of said first warp yarn (2') is different than the length of the under portions (4) of the adjacent warp yarns (2",2'''), wherein said fabric having a repeating unit of 5 warps and 10 wefts, being the warp pattern pattern 1b/3a/1b/1a/3b/1a, 1b/1a/3b/1a/1b/3a, 1b/1a/1b/3a/1b/1a/2b, 2a/1b/1a/3b/1a/1b/1a and 3b/1a/1b/3a/1b/1a; wherein a is an under portion and b is an over portion, and wherein the warp yarns (2) consist of cotton and have Ne in a range of 10 to 30 Ne.

5. A woven double face fabric (1) having warp yarns (2) and weft yarns (3) providing a pattern whereby a warp yarn (2) floats over one or more weft yarns (3) to provide a corresponding over portion (5) and floats under one or more weft yarns to provide under portions (4), at least part of the weft yarns (3) being elastic yarns, wherein a repeat unit of a first warp yarn (2') floats over at least three weft yarns on said first side of the fabric to provide a corresponding warp over portion (5), said first warp yarn successively floating under one single weft yarn (3) to provide an under portion (4), whereby in said first warp yarn the total length of over portions is greater than the length of under portions, wherein each of two adjacent warp yarns (2", 2''') arranged adjacent said first warp yarn (2') floats under at least three weft yarns to provide a corresponding warp under portion (4) on said second side of the fabric, each said adjacent warp yarn successively floating over one single weft yarn (3) to provide an over portion (5) on said first side of the fabric, wherein the length of the over portion (5) of said first warp yarn (2') is different than the length of the under portions (4) of the adjacent warp yarns (2",2'''); and said fabric having a repeating unit of 8 warps and 4 wefts, being the warp pattern 3b/1a, 1a/1b/2a, 1a/3b, 2a/1b/1a, 1b/1a/2b, 3a/1b, 2b/1a/1b and 1b/3a; wherein a is an under portion and b is an over portion.

\* \* \* \* \*